United States Patent
Okafuji et al.

(10) Patent No.: US 12,187,840 B2
(45) Date of Patent: Jan. 7, 2025

(54) VEHICLE CUSHION PAD AND VEHICLE SEAT CUSHION

(71) Applicant: INOAC CORPORATION, Aichi (JP)

(72) Inventors: Akiyoshi Okafuji, Aichi (JP); Tadashi Yano, Aichi (JP)

(73) Assignee: INOAC CORPORATION, Nagoya (JP)

( * ) Notice: Subject to any disclaimer, the term of this patent is extended or adjusted under 35 U.S.C. 154(b) by 0 days.

(21) Appl. No.: 17/210,750

(22) Filed: Mar. 24, 2021

(65) Prior Publication Data

US 2021/0301068 A1    Sep. 30, 2021

(30) Foreign Application Priority Data

Mar. 27, 2020 (JP) .................................. 2020-057489
Feb. 26, 2021 (JP) .................................. 2021-029920

(51) Int. Cl.
| | |
|---|---|
| *B60N 2/62* | (2006.01) |
| *B60N 2/64* | (2006.01) |
| *B60N 2/70* | (2006.01) |
| *C08G 18/18* | (2006.01) |
| *C08G 18/20* | (2006.01) |
| *C08G 18/24* | (2006.01) |
| *C08G 18/48* | (2006.01) |
| *C08G 18/68* | (2006.01) |
| *C08G 18/76* | (2006.01) |
| *C08K 5/101* | (2006.01) |
| *C08K 5/11* | (2006.01) |

(52) U.S. Cl.
CPC ............ *C08G 18/7621* (2013.01); *B60N 2/64* (2013.01); *C08G 18/1816* (2013.01); *C08G 18/244* (2013.01); *C08G 18/4829* (2013.01)

(58) Field of Classification Search
None
See application file for complete search history.

(56) References Cited

U.S. PATENT DOCUMENTS

| | | | | |
|---|---|---|---|---|
| 3,579,471 A | * | 5/1971 | Dijkhuizen et al. ... | C08J 9/0061 521/137 |
| 4,751,253 A | * | 6/1988 | Tylenda ................ | C08G 18/281 521/157 |
| 4,791,146 A | * | 12/1988 | Tylenda ................. | C08K 5/103 521/157 |
| 5,137,929 A | * | 8/1992 | Demmin ................ | C08G 18/28 521/122 |
| 5,527,834 A | * | 6/1996 | Fujita .................. | C08G 18/2865 521/157 |
| 5,691,392 A | * | 11/1997 | Okoroafor ............. | C08J 9/0023 521/122 |
| 5,916,939 A | * | 6/1999 | Gillis .................. | C08G 18/1875 524/92 |
| 5,944,389 A | * | 8/1999 | Zenba ...................... | B60N 2/70 297/452.48 |
| 2012/0041090 A1 | | 2/2012 | Parmentier et al. | |
| 2015/0045466 A1 | * | 2/2015 | Sofuku et al. ......... | C08G 18/63 521/129 |
| 2018/0273674 A1 | * | 9/2018 | Klesczewski ........ | C08G 18/244 |
| 2022/0106432 A1 | * | 4/2022 | Hermann ........... | C08G 18/1825 |

FOREIGN PATENT DOCUMENTS

| | | | |
|---|---|---|---|
| CN | 102378771 A | | 3/2012 |
| JP | 2003286692 A | * | 10/2003 |
| JP | 2004-121829 A | | 4/2004 |
| JP | 2007204551 A | * | 8/2007 |
| JP | 4393453 B2 | | 1/2010 |
| JP | 2010-202761 A | | 9/2010 |
| JP | 2014-128359 A | | 7/2014 |

OTHER PUBLICATIONS

"Poly(ethylene glycol) dioleate" technical data sheet obtained from the Sigma Aldrich website in Apr. 2022.*
Data sheet for CAS Registry No. 94109-53-2 obtained from the American Chemical Society (C) 2022.*
Machine translation of JP-2003286692-A obtained from Clarivate Analytics in Oct. 2022.*
Machine translation of JP-2007204551-A obtained from Clarivate Analytics in Apr. 2023 (Year: 2023).*

* cited by examiner

*Primary Examiner* — Melissa A Rioja
(74) *Attorney, Agent, or Firm* — Sughrue Mion, PLLC

(57) ABSTRACT

Provided is, a vehicle cushion pad including a polyurethane foam, in which the polyurethane foam is made of a polyurethane foam composition containing a polyol, an isocyanate, a catalyst, a foaming agent, and an additive, the additive is a dicarboxylic acid ester compound having a weight average molecular weight of 500 to 5000, and an airflow quantity of the polyurethane foam in accordance with JIS K 6400-7: 2012 is 6.0 cc/cm$^2$/s or more, and a vehicle seat cushion including a cushion main body and the vehicle cushion pad placed on the cushion main body.

6 Claims, 1 Drawing Sheet

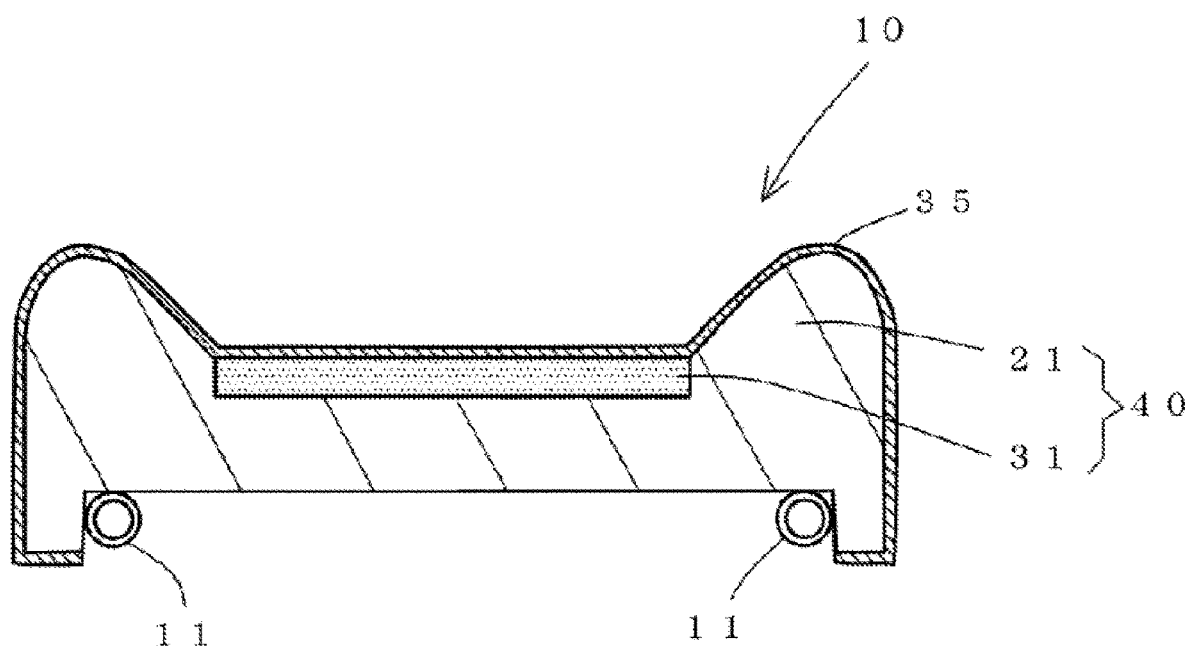

VEHICLE CUSHION PAD AND VEHICLE SEAT CUSHION

CROSS REFERENCES TO RELATED APPLICATIONS

This application is based on Japanese Patent Application (No. 2020-057489) filed on Mar. 27, 2020 and Japanese Patent Application (No. 2021-029920) filed on Feb. 26, 2021, the contents of which are incorporated herein by reference.

TECHNICAL FIELD

The present invention relates to a vehicle cushion pad and a vehicle seat cushion where the vehicle cushion pad is placed on a cushion main body.

BACKGROUND ART

In the related art, there is a vehicle seat cushion where a cushion pad is placed on a cushion main body in order to improve a seating feeling.

For example, Japanese Patent No. 4393453 discloses a structure in which a soft slab polyurethane foam is placed on a mold cushion.

SUMMARY OF THE INVENTION

Problems that the Invention is to Solve

However, in a vehicle seat in the related art, it is desired to reduce discomfort due to vibration during running of a vehicle.

The present invention has been made in view of the above points, and an object of the present invention is to provide a vehicle cushion pad that reduces discomfort due to vibration during running of the vehicle and a vehicle seat cushion where the vehicle cushion pad is placed on a cushion main body.

Means for Solving the Problems

In order to overcome the above problems and achieve the intended object, according to the present invention, the gist of the present invention is set forth below.
(1) A vehicle cushion pad including a polyurethane foam, in which the polyurethane foam is made of a polyurethane foam composition containing a polyol, an isocyanate, a catalyst, a foaming agent, and an additive, the additive is a dicarboxylic acid ester compound having a weight average molecular weight of 500 to 5000, and an airflow quantity of the polyurethane foam in accordance with JIS K 6400-7: 2012 is 6.0 cc/cm$^2$/s or more.
(2) The vehicle cushion pad according to the item (1), in which the polyurethane foam has a resonance magnification in a vibration test by JASO B407 of 1.5 to less than 3.43, and an integrated value of a transmissibility of 1 or more at a vibration frequency of from 5 Hz to 10 Hz is 500 to less than 915.
(3) The vehicle cushion pad according to the item (1), in which the polyurethane foam has a hardness in accordance with JIS K 6400-2: 2012 6.7 D method of 80 N to 250 N.
(4) The vehicle cushion pad according to the item (1), in which the dicarboxylic acid ester compound has a melting point of −20° C. or higher.
(5) The vehicle cushion pad according to the item (1), in which the polyurethane foam has the density of 30 kg/m$^3$ to 150 kg/m; in accordance with JIS K7220.
(6) A vehicle seat cushion including a cushion main body and the vehicle cushion pad according to the item (1) placed on the cushion main body.

ADVANTAGEOUS EFFECTS OF INVENTION

According to the invention of the first aspect, since an additive contained in a polyurethane foam composition is a dicarboxylic acid ester compound having a weight average molecular weight of 500 to 5000 and an airflow quantity in accordance with JIS K 6400-7: 2012 in the polyurethane foam is 6.0 cc/cm$^2$/s or more, the discomfort due to vibration during running of a vehicle can be reduced.

With regard to vibration riding feeling performance of the seat cushion, according to British Standard 6841 (BS 6841), a degree of discomfort with respect to vertical vibration of the seat is the most sensitive at a frequency band of 5 Hz to 16 Hz, and sensitivity of the discomfort decreases as the vibration is away from the frequency band thereof.

According to the invention of the second aspect, since the polyurethane foam has a resonance magnification in a vibration test by JASO B407 as low as 1.5 to less than 3.43, sensitivity of an occupant to the degree of discomfort becomes dull. Further an integrated value of a transmissibility of 1 or more at a vibration frequency of from 5 Hz to 10 Hz is as small as 500 to less than 915, so that the degree of discomfort to be felt becomes low, and sitting feeling becomes good.

According to the invention of the third aspect, the polyurethane foam has a hardness in accordance with JIS K 6400-2. 2012 6.7 D method of 80 N to 250 N, so that bottoming at the time of seating is reduced and a sitting feeling can be improved.

According to the invention of the fourth aspect, since the melting point of the dicarboxylic acid ester compound having a weight average molecular weight of 500 to 5000 is −20° C. or higher, a sense of touch at the time of seating can be improved.

According to the invention of the fifth aspect, since the polyurethane foam has a density of the 30 kg/m$^3$ to 150 kg/m$^3$ in accordance with JIS K7220, bottoming of an occupant sitting down the vehicle cushion pad is difficult to occur, and cushioning properties can be improved and the polyurethane foam becomes light, which can contribute to lightweight properties of a vehicle.

According to the invention of the sixth aspect, the vehicle seat cushion in which the cushion pad of the present invention is placed on the cushion main body can reduce discomfort due to vibration during running of a vehicle due to an effect exhibited by the cushion pad.

BRIEF DESCRIPTION OF DRAWINGS

The FIGURE is a cross-sectional view of an embodiment of a vehicle seat where a cushion pad of the present invention is placed on a seat cushion.

DESCRIPTION OF EMBODIMENTS

Hereinafter, embodiments of a vehicle cushion pad and a vehicle seat cushion according to the present invention will be described using a vehicle seat 10 shown in the FIGURE.

The vehicle seat 10 shown in the FIGURE includes a seat frame 11, a cushion main body 21, a cushion pad 31, and a skin material 35.

The cushion pad 31 is the vehicle cushion pad of the present invention, and the cushion main body 21 and the cushion pad 31 constitute a vehicle seat cushion 40 of the present invention.

The FIGURE shows only a seat portion side, and a backrest side is omitted. In a case of a temperature control seat cushion, a heater (not shown in the FIGURE) is disposed on the cushion pad 31, and the seat cushion is covered with the skin material 35 along with the heater.

The seat frame 11 supports the vehicle seat and fixes the vehicle seat in a vehicle compartment. Further the seat frame 11 is made of a material having high rigidity such as metal, and has a structure depending on the vehicle type.

The cushion main body 21 is made of an elastic foam such as a polyurethane foam. The cushion main body 21 has higher hardness and less lowering of the elastic restoring force by long-term use than the cushion pad 31 so as to support weight of the occupant. As the preferable cushion main body 21, a polyurethane foam having a hardness (JIS K 6400-2: 2012 6.7 D method) of 80 N to 250 N, a density (JIS K 7222) of 30 kg/m; to 150 kg/m$^3$, more preferably 50 kg/m$^3$ to 100 kg/m$^3$, an impact resilience (JIS K 6400-3: 2011) of 25% to 55% is preferable.

In addition, in the shown cushion main body 21, both left and right side portions of an upper surface swell, and a central portion is lowered, in order to improve support properties of buttocks of a seated person. The cushion pad 31 is placed on the lowered central portion.

The cushion pad (the vehicle cushion pad of the present invention) 31 is formed from a polyurethane foam composition (polyurethane foam raw material) containing a polyol, an isocyanate, a catalyst, a foaming agent and an additive.

As the polyol, a polyol for polyurethane foam can be used. For example, any of a polyether polyol, a polyester polyol and a polyether ester polyol may be used, and one or more thereof may be used.

Examples of the polyether polyol include polyether polyols obtained by adding alkylene oxides such as ethylene oxide (EO) and propylene oxide (PO) to polyhydric alcohols such as ethylene glycol, diethylene glycol, propylene glycol, dipropylene glycol, butylene glycol, neopentyl glycol, glycerin, pentaerythritol, trimethylolpropane, sorbitol and sucrose.

Examples of the polyester polyol include polyester polyols obtained by polycondensation of aliphatic carboxylic acids such as malonic acid, succinic acid and adipic acid or aromatic carboxylic acids such as phthalic acid with aliphatic glycols such as ethylene glycol, diethylene glycol and propylene glycol.

Examples of the polyether ester polyol include those obtained by reacting the above polyether polyol with a polybasic acid to form a polyester, or those having both segments of a polyether and a polyester in one molecule.

It is preferable to use one or more polyols each having a hydroxyl value (OHV) of 30 mg KOH/g to 300 mg KOH/g, a functional group number of 2 to 4, and a molecular weight Mw of preferably 500 to 7000, more preferably 2000 to 6000, as the polyol.

As the isocyanate, aliphatic or aromatic polyisocyanates having two or more isocyanate groups, a mixture thereof, and modified polyisocyanates obtained by modifying the polyisocyanates can be used. Examples of the aliphatic polyisocyanates include hexamethylene diisocyanate, isophorone diisocyanate and dicyclohexylmethane diisocyanate, and examples of the aromatic polyisocyanates include toluene diisocyanate (TDI), diphenylmethane diisocyanate (MDI), naphthalene diisocyanate, xylylene diisocyanate and polymeric MDI (crude MDI). Prepolymers having an isocyanate group at the end which can be obtained by reaction between a polyol and an excess amount of polyisocyanate can also be used.

An isocyanate index of the composition is preferably 90 to 130. The isocyanate index is calculated by [(isocyanate equivalent in polyurethane foam raw material/active hydrogen equivalent in polyurethane foam raw material)×100].

As the catalyst, those publicly known for a polyurethane foam can be used. Examples thereof include: amine catalysts such as triethylamine, triethylenediamine, diethanolamine, dimethylamino morpholine, N-ethyl morpholine and tetramethylguanidine; tin catalysts such as stannous octoate and dibutyltin dilaurate; and metal catalysts (also called organometallic catalysts) such as phenyl mercury propionate and lead octenoate. A total amount of the catalyst is preferably about 0.1 to 2 parts by weight with respect to 100 parts by weight of the polyol.

As the foaming agent, water, a hydrocarbon such as alternative chlorofluorocarbon or pentane can be used alone or in combination. In the case of water, carbon dioxide gas is generated during a reaction with the polyisocyanate, and the carbon dioxide gas causes foaming. The amount of water used as the foaming agent is preferably about 1 to 6 parts by weight with respect to 100 parts by weight of the polyol. In addition, when another foaming agent is used in combination with water, the amount of the another foaming agent is appropriately determined.

As the additive, a dicarboxylic acid ester compound having a weight average molecular weight of 500 to 5000 can be used. The weight average molecular weight of the dicarboxylic acid ester compound is preferably 800 to 3000. The dicarboxylic acid ester compound is an ester condensate of a dicarboxylic acid and an alcohol, and an end of an alcohol part is not only carbon, but may be a hydroxyl group or an amino group.

When the weight average molecular weight of the dicarboxylic acid ester compound is less than 500, an integrated value of a transmissibility of 1 or more at a vibration frequency of from 5 Hz to 10 Hz in a vibration test becomes large, and an effect of reducing discomfort due to vibration becomes small. On the other hand, when the weight average molecular weight of the dicarboxylic acid ester compound exceeds 5,000, viscosity of the polyurethane foam composition increases, and a polyurethane foam in a good foamed state that can be used as a cushion pad cannot be obtained.

The dicarboxylic acid ester compound having a weight average molecular weight of 500 to 5000 preferably has a melting point of −20° C. or higher, more preferably 0° C. or higher, and still more preferably 25° C. or higher. The dicarboxylic acid ester compound having a weight average molecular weight of 500 to 5000 and the melting point of −20° C. or higher can improve a sense of touch at the time of seating.

The amount of the dicarboxylic acid ester compound having a weight average molecular weight of 500 to 5000 in the composition is preferably about 5 to 150 parts by weight, and more preferably 10 to 100 parts by weight with respect to 100 parts by weight of the polyol. When the amount of the dicarboxylic acid ester compound is less than 5 parts by weight, the effect of reducing discomfort due to vibration decreases. On the other hand, when the amount of the dicarboxylic acid ester compound exceeds 150 parts by weight, the polyurethane foam in a good foamed state that can be used as the cushion pad cannot be obtained.

Examples of the dicarboxylic acid ester compound having a weight average molecular weight of 500 to 5000 which can be used in the present invention include distearyl dimerate (weight average molecular weight: 900, melting point: 23° C., OH value: 10), dilauryl dimerate (weight average molecular weight: 815, melting point: 23° C., OH value: 10), and polyester polyol dimerate (weight average molecular weight: 2500, melting point: lower than −20° C., OH value: 74.4).

In the polyurethane foam composition, other main components to be blended as appropriate can include a surfactant, a flame retardant, a filler, a stabilizer, a colorant, a plasticizer, an antimicrobial agent, and the like.

Examples of the surfactant include a silicone compound, an anionic surfactant such as sodium dodecylbenzene sulfonate or sodium laurate, a polyether siloxane and a phenolic compound. The amount of the surfactant is, for example, 0.5 to 5.0 parts by weight with respect to 100 parts by weight of the polyol.

Examples of the flame retardant include phosphoric ester-based flame retardants such as triphenyl phosphate, tricresyl phosphate, trixylenyl phosphate, cresyl diphenyl phosphate, trimethyl phosphate, triethyl phosphate, tributyl phosphate, trioctyl phosphate, diethylphenyl phosphonate, dimethylphenyl phosphonate and resorcinol diphenyl phosphate; and inorganic flame retardants such as magnesium hydroxide and aluminum hydroxide. The amount of the flame retardant is about 3 to 30 parts by weight with respect to 100 parts by weight of the polyol.

The polyurethane foam may be produced by slab foaming or mold foaming.

Slab foaming is a method of mixing the polyurethane foam composition (polyurethane foam raw material), discharging the mixture onto a belt conveyor, and foaming the mixture at room temperature under atmospheric pressure. The slab foamed polyurethane foam is then cut into a predetermined size to form the cushion pad 31.

On the other hand, mold foaming is a method of mixing the polyurethane foam composition (polyurethane foam raw material), injecting the mixture into a cavity of a mold, and foaming the mixture into a cavity shape. The cavity has the shape of the cushion pad 31.

An airflow quantity of the polyurethane foam in accordance with JIS K 6400-7: 2012 is 6.0 cc/cm$^2$/s or more, preferably 10 to 150 cc/cm$^2$/s. When the airflow quantity is less than 6.0 cc/cm$^2$/s, as shown in Comparative Example 4 and Comparative Example 5 compared with Comparative Example 1, an integrated value of a transmissibility of 1 or more at a vibration frequency of from 5 Hz to 10 Hz increases from 915 to 1072 or 1065, and an anti-vibration effect cannot be obtained but rather is impaired. The airflow quantity of the polyurethane foam is generally controlled by the composition of the foaming agent, the catalysts, the surfactant and the isocyanate, but the airflow rate of the polyurethane foam can also be controlled by adding the dicarboxylic acid ester compound having a weight average molecular weight of 500 to 5000 of the present invention.

Vibration characteristics of the polyurethane foam are such that a resonance magnification in a vibration test in JASO B407 is preferably 1.5 to less than 3.43, more preferably 1.7 to 3.0, and an integrated value of a transmissibility of 1 or more at a vibration frequency of from 5 Hz to 10 Hz is preferably 500 to less than 915, more preferably 500 to 870. As described above, in the polyurethane foam, when the vibration characteristics including the resonance magnification and an integrated value of a transmissibility of 1 or more at an uncomfortable vibration frequency to an occupant of from 5 Hz to 10 Hz are within the above range, sensitivity of an occupant to a degree of discomfort can be dull, and a sitting feeling can be improved. The vibration characteristics of the polyurethane foam can be achieved by adding the dicarboxylic acid ester compound having a weight average molecular weight of 500 to 5000 of the present invention.

The polyurethane foam preferably has a hardness in accordance with JIS K6400-2: 2012 6.7 D method of 80 N to 250 N, and more preferably 90 N to 180 N. When the hardness is within this range, the sitting feeling can be improved since bottoming at the time of seating is difficult to occur, and a sense of touch at the time of seating can be improved.

The hardness of the polyurethane foam is generally controlled by the composition of the foaming agent, the catalysts and the isocyanate, but the hardness of the polyurethane foam can also be controlled by adding the dicarboxylic acid ester compound having a weight average molecular weight of 500 to 5000 of the present invention.

A density of the polyurethane foam (in accordance with JIS K7220) is preferably 30 kg/m$^3$ to 150 kg/m$^3$, more preferably 50 kg/m; to 100 kg/m$^3$. When the density is within this range, bottoming is difficult to occur, and cushioning properties can be improved and the polyurethane foam becomes light, which can contribute to lightweight properties of a vehicle.

The density of the polyurethane foam is generally controlled by the composition of the foaming agent, the catalysts and the isocyanate, but the density of the polyurethane foam can also be controlled by adding the dicarboxylic acid ester compound having a weight average molecular weight of 500 to 5000 of the present invention.

The skin material 35 is made of appropriate material such as fabric, leather and a synthetic resin sheet, and is formed into a predetermined shape by sewing or the like and can cover an outer surface of the vehicle seat cushion 40.

EXAMPLES

Polyurethane foams for vehicle cushion pads of Examples and Comparative Examples were produced by box foaming from polyurethane foam compositions (polyurethane foam raw material) in which the following raw materials prepared into the composition as shown in Table 1.

TABLE 1

|  |  | Example 1 | Example 2 | Example 3 | Example 4 | Example 5 | Comparative Example 1 |
|---|---|---|---|---|---|---|---|
| Polyol | part by weight | 100 | 100 | 100 | 100 | 100 | 100 |
| Additive 1 | part by weight |  |  |  |  |  |  |
| Additive | part by |  | 10 | 20 |  |  |  |

TABLE 1-continued

|  |  |  |  |  |  |  |  |
|---|---|---|---|---|---|---|---|
| Additive 2 | part by weight |  |  |  |  |  |  |
| Additive 3 | part by weight |  |  |  |  |  |  |
| Additive 4 | part by weight |  |  |  |  |  |  |
| Additive 5 | part by weight | 10 |  |  | 100 |  |  |
| Additive 6 | part by weight |  |  |  |  | 10 |  |
| Foaming agent (water) | part by weight | 1.85 | 1.85 | 1.85 | 1.85 | 1.85 | 1.85 |
| Amine catalyst | part by weight | 0.25 | 0.25 | 0.25 | 0.25 | 0.25 | 0.25 |
| Surfactant | part by weight | 0.27 | 0.27 | 0.27 | 0.27 | 0.27 | 0.27 |
| Tin catalyst | part by weight | 0.296 | 0.296 | 0.296 | 0.296 | 0.296 | 0.296 |
| Isocyanate 1 | part by weight | 8.3 | 8.3 | 8.3 | 8.3 | 8.3 | 8.3 |
| Isocyanate 1 | part by weight | 18.7 | 18.7 | 18.7 | 18.7 | 18.7 | 18.7 |
| Isocyanate index |  | 105 | 105 | 105 | 105 | 105 | 100 |
| Density | kg/m$^3$ | 55.5 | 53.6 | 58.7 | 108.1 | 54.3 | 50.3 |
| Hardness | N | 146 | 180 | 174 | 92 | 143 | 144 |
| Impact resilience | % | 52.3 | 44.4 | 37.5 | 29 | 53.2 | 53.7 |
| Airflow quantity | cc/cm$^2$/s | 90.0 | 116.7 | 123.7 | 10.2 | 92.1 | 118.0 |
| Resonance frequency | Hz | 4.00 | 5.00 | 4.93 | 5.66 | 4.12 | 3.96 |
| Resonance magnification |  | 3.05 | 2.04 | 1.75 | 1.76 | 2.98 | 3.43 |
| Integrated value of a transmissibility of 1 or more at a vibration frequency of from 5 Hz to 10 Hz |  | 566 | 749 | 869 | 507 | 855 | 915 |
| Foaming moldability |  | good | good | good | good | good | good |

|  |  | Comparative Example 2 | Comparative Example 3 | Comparative Example 4 | Comparative Example 5 | Comparative Example 6 | Comparative Example 7 |
|---|---|---|---|---|---|---|---|
| Polyol | part by weight | 100 | 100 | 100 | 100 | 100 | 100 |
| Additive 1 | part by weight | 10 | 20 |  |  |  |  |
| Additive 2 | part by weight |  |  |  |  |  |  |
| Additive 3 | part by weight |  |  | 10 | 20 |  |  |
| Additive 4 | part by weight |  |  |  |  | 10 | 20 |
| Additive 5 | part by weight |  |  |  |  |  |  |
| Additive 6 | part by weight |  |  |  |  |  |  |
| Foaming agent (water) | part by weight | 1.85 | 1.85 | 1.85 | 1.85 | 1.85 | 1.85 |
| Amine catalyst | part by weight | 0.25 | 0.25 | 0.25 | 0.25 | 0.25 | 0.25 |
| Surfactant | part by weight | 0.27 | 0.27 | 0.27 | 0.27 | 0.27 | 0.27 |
| Tin catalyst | part by weight | 0.296 | 0.296 | 0.296 | 0.296 | 0.296 | 0.296 |
| Isocyanate 1 | part by weight | 8.3 | 8.3 | 8.3 | 8.3 | 8.3 | 8.3 |
| Isocyanate 1 | part by weight | 18.7 | 18.7 | 18.7 | 18.7 | 18.7 | 18.7 |
| Isocyanate index |  | 100 | 105 | 105 | 105 | 100 | 100 |
| Density | kg/m$^3$ | 57.4 | 70.7 | 52.9 | 54.2 | 59.6 | 74.3 |
| Hardness | N | 120 | 127 | 117 | 109 | 128 | 110 |
| Impact | % | 55.6 | 53.6 | 25.5 | 43 | 55 | 54 |

TABLE 1-continued

|  | | | | | | | |
|---|---|---|---|---|---|---|---|
| resilience | | | | | | | |
| Airflow quantity | cc/cm$^2$/s | 90.8 | 35.0 | 3.2 | 0.1 | 137.0 | 14.5 |
| Resonance frequency | Hz | 4.65 | 5.10 | 8.69 | 9.07 | 4.0 | 4.9 |
| Resonance magnification | | 3.53 | 3.22 | 2.32 | 2.48 | 3.8 | 3.1 |
| Integrated value of a transmissibility of 1 or more at a vibration frequency of from 5 Hz to 10 Hz | | 964 | 991 | 1072 | 1065 | 623.3 | 785.1 |
| Foaming moldability | | good | good | good | good | good | poor |

A polyethylene film having thickness of 0.1 mm×height of 370 mm×length of 370 mm×width of 370 mm was set in a quadrate box having height of 300 mm×length of 370 mm×width of 370 mm to obtain a foaming box. A total amount of input weights of the components was calculated from a target density so that polyurethane foams for vehicle cushion pads having height of 300 mm×length of 370 mm×width of 370 mm was obtained, and an input amount was divided by a total blending ratio when the polyol was 100 whereby a blending ration was calculated.

For example, in Comparative Example 1, since the target density is 55, a total amount of input weights of 1691 g needs to be input in order to obtain a specified volume. Since the total blending ratio was 103, blending was made with the blending ratio of 13 times.

Using a measuring instrument, components other than an isocyanate were weighed and put into a 3 liter polypropylene container and premixed for 20 seconds with a mixer that rotates continuously at 1720 RPM, and then the isocyanate was input, mixed for 5 seconds, and immediately put into the foaming box to form a foam.

Polyol: polyether polyol, molecular weight: 3000, a functional group number: 3, hydroxyl value: 56.1 mg KOH/g, ethylene oxide content percentage: 8%, product name: GP-3050NS, manufactured by Sanyo Chemical Industries, Ltd.

Additive 1: diisononyl adipate: weight average molecular weight: 400, melting point: −68° C., OH value: 0, product name: DINA, manufactured by DAIHACHI CHEMICAL INDUSTRY CO., LTD.

Additive 2: polyester polyol dimerate, weight average molecular weight: 2500, a functional group number: 3.31, melting point: less than −20° C., OH value: 74.4, product name: T2458, manufactured by Hitachi Chemical Polymer Co., Ltd.

Additive 3: grease, freezing point: −12.5° C., product name: FPL-32, manufactured by MORESCO Corporation Additive 4: isohexadecyl stearate, weight average molecular weight: 509, a functional group number: 0, melting point: 0° C. or lower, OH value: 0, product name: isohexadecyl stearate, manufactured by FUJIFILM Wako Chemical Corporation Additive 5: distearyl dimerate, weight average molecular weight: 900, a functional group number: 0.16, melting point: 25° C., OH value: 10, manufactured by INOAC Corporation Additive 6: dilauryl dimerate, weight average molecular weight: 815, a functional group number: 0.15, melting point: 23° C., OH value: 10, manufactured by INOAC Corporation Foaming agent: water Amine catalyst: product name: DABCO 33LSI, manufactured by Air Products and Chemicals, Inc.

Surfactant: silicone surfactant, product name: Tegostab B8239, manufactured by Evonik Industries AG Tin catalyst: tin octylate, product name: MRH-110, manufactured by JOHOKU CHEMICAL CO., LTD Isocyanate 1: TDI including 2,4-TDI and 2,6-TDI at a ratio of 80:20, product name: T-80, manufactured by Nippon Polyurethane Industry Isocyanate 2: TDI including 4-TDI and 2,6-TDI at a ratio of 67:33, product name: T-67, manufactured by Nippon Polyurethane Industry <Synthesis Method of Distearyl Dimerate>

2 mol of stearyl alcohol was added to 1 mol of a dimer acid. 0.1 part by weight of a titanium tetraisopropoxide was added with respect to 100 parts by weight of the stearyl alcohol and the dimer acid as a catalyst, and a dehydration esterification reaction was performed for 16 hours while discharging condensed water at 120° C. to 180° C. The remaining stearyl alcohol was removed by heating under reduced pressure, then active white clay was added to a reactive product and stirred for one hour, and then unreacted substances were removed by filtration to obtain distearyl dimerate.

<Synthesis Method of Dilauryl Dimerate>

2 mol of dilauryl alcohol was added to 1 mol of a dimer acid. 0.1 part by weight of a titanium tetraisopropoxide was added with respect to 100 parts by weight of the stearyl alcohol and the dimer acid as a catalyst, and a dehydration esterification reaction was performed for 16 hours while discharging condensed water at 120° C. to 180° C. The remaining dilauryl alcohol was removed by heating under reduced pressure, then active white clay was added to a reactive product and stirred for one hour, and then unreacted substances were removed by filtration to obtain dilauryl dimerate.

With respect to the polyurethane foams of Examples and Comparative Examples, a density, a hardness, impact resilience, an airflow quantity and a vibration test were measured, and foaming moldability was determined. A measurement method is shown below. The measurement results are shown in Table 1.

The density (kg/m$^3$) was measured in accordance with JIS K 7222.

The hardness (N) was measured for a measurement sample of 250 mm×250 mm×50 mm in accordance with JIS K 6400-2: 2012 6.7 D method.

The impact resilience (%) was measured for a measurement sample of 250 mm 250 mm×50 mm in accordance with JIS K 6400-3: 2011.

The airflow quantity ($cc/cm^2/s$) was measured for a measurement sample of 200 mm×200 mm×10 mm in accordance with JIS K 6400-7: 2012.

In the vibration test, a resonance frequency (Hz), a resonance magnification and an integrated value of a transmissibility of 1 or more at a vibration frequency of from 5 Hz to 10 Hz were measured for a measurement sample of 250 mm×250 mm×50 mm in accordance with JASO B407. The resonance frequency (Hz) is a frequency when the transmissibility is at the peak, and the resonance magnification is the highest transmissibility. The integrated value of a transmissibility of 1 or more at a vibration frequency of from 5 Hz to 10 Hz is a value obtained by integrating a transmissibility of 1 or more at an uncomfortable vibration frequency to an occupant of from 5 Hz to 10 Hz with respect to vertical vibration of the seat, that is, total value. The transmissibility is integrated from 5 Hz, due to starting point of uncomfortableness by the vertical vibration, to 10 Hz because the transmissibility of exceeding 10 Hz is less than 1.0. The discomfort on the human body can be quantized by obtaining the integrated value of a transmissibility of 1 or more at a vibration frequency of from 5 Hz to 10 Hz.

The foaming moldability was evaluated as "good" when the polyurethane foam could be molded well without failure, and was evaluated as "poor" when there was a foaming failure such as shrinkage or puncture.

Configurations and measurement results of Examples and Comparative Examples are described.

Example 1

In Example 1, 100 parts by weight of the polyol, 10 parts by weight of the additive 5 (distearyl dimerate, manufactured by INOAC Corporation), 1.85 parts by weight of the foaming agent (water), 0.25 part by weight of the amine catalyst, 0.27 part by weight of the surfactant, 0.296 part by weight of the tin catalyst, 8.3 parts by weight of isocyanate 1 (T-80), and 18.7 parts by weight of isocyanate 2 (T-67) are blended, and an isocyanate index is 105.

The polyurethane foam of Example 1 has a density of 55.5 $kg/m^3$, a hardness of 146 N, impact resilience of 52.3%, an airflow quantity of 90 $cc/cm^2/s$, a resonance frequency of 4.00 Hz, a resonance magnification of 3.05, an integrated value of a transmissibility of 1 or more at a vibration frequency of from 5 Hz to 10 Hz of 866, and "good" foaming moldability.

The polyurethane foam of Example 1 has an airflow quantity of 6 $cc/cm^2/s$ or more, a resonance magnification in the vibration test by JASO B407 in a range of 1.5 to 3.43, and an integrated value of a transmissibility of 1 or more at a vibration frequency of from 5 Hz to 10 Hz in a range of 500 to less than 915, so that discomfort due to vibration during vehicle running is small, and a sitting feeling is good. Since the hardness is in a range of 80 N to 250 N, it is possible to reduce bottoming at the time of seating and to improve the sitting feeling.

Example 2

Example 2 is the same as Example 1 except that 10 parts by weight of the additive 2 (polyester polyol dimerate, product name: T2458) was added instead of the additive 5 (distearyl dimerate, manufactured by INOAC Corporation) in Example 1.

The polyurethane foam of Example 2 has a density of 53.6 $kg/m^3$, a hardness of 180 N, impact resilience of 44.4%, an airflow quantity of 116.7 $cc/cm^2/s$, a resonance frequency of 5.00 Hz, a resonance magnification of 2.04, an integrated value of a transmissibility of 1 or more at a vibration frequency of from 5 Hz to 10 Hz of 749, and "good" foaming moldability.

The polyurethane foam of Example 2 has an airflow quantity of 6 $cc/cm^2/s$ or more, a resonance magnification in the vibration test by JASO B407 in a range of 1.5 to 3.43, and an integrated value of a transmissibility of 1 or more at a vibration frequency of from 5 Hz to 10 Hz in a range of 500 to less than 915, so that discomfort due to vibration during vehicle running is small, and a sitting feeling is good. Since the hardness is in a range of 80 N to 250 N, it is possible to reduce bottoming at the time of seating and to improve the sitting feeling.

Example 3

Example 3 is the same as Example 2 except that an amount of the additive 2 (polyester polyol dimerate, product name: T2458) in Example 2 was 20 parts by weight.

The polyurethane foam of Example 3 has a density of 58.7 $kg/m^3$, a hardness of 174 N, impact resilience of 37.5%, an airflow quantity of 123.7 $cc/cm^2/s$, a resonance frequency of 4.93 Hz, a resonance magnification of 1.75, an integrated value of a transmissibility of 1 or more at a vibration frequency of from 5 Hz to 10 Hz of 869, and "good" foaming moldability.

The polyurethane foam of Example 3 has an airflow quantity of 6 $cc/cm^2/s$ or more, a resonance magnification in the vibration test by JASO B407 in a range of 1.5 to 3.43, and an integrated value of a transmissibility of 1 or more at a vibration frequency of from 5 Hz to 10 Hz in a range of 500 to less than 915, so that discomfort due to vibration during vehicle running is small, and a sitting feeling is good. Since the hardness is in a range of 80 N to 250 N, it is possible to reduce bottoming at the time of seating and to improve the sitting feeling.

Example 4

Example 4 is the same as Example 1 except that an amount of the additive 5 (distearyl dimerate, manufactured by INOAC Corporation) in Example 1 was 100 parts by weight.

The polyurethane foam of Example 4 has a density of 108.1 $kg/m^3$, a hardness of 92 N, impact resilience of 29%, an airflow quantity of 10.2 $cc/cm^2/s$, a resonance frequency of 5.66 Hz, a resonance magnification of 1.76, an integrated value of a transmissibility of 1 or more at a vibration frequency of from 5 Hz to 10 Hz of 507, and "good" foaming moldability.

The polyurethane foam of Example 4 has an airflow quantity of 6 $cc/cm^2/s$ or more, a resonance magnification in the vibration test by JASO B407 in a range of 1.5 to 3.43, and an integrated value of a transmissibility of 1 or more at a vibration frequency of from 5 Hz to 10 Hz in a range of 500 to less than 915, so that discomfort due to vibration during vehicle running is small, and a sitting feeling is good. Since the hardness is in a range of 80 N to 250 N, it is possible to reduce bottoming at the time of seating and to improve the sitting feeling.

Example 5

Example 5 is the same as Example 1 except that 10 parts by weight of the additive 6 (dilauryl dimerate, manufactured by INOAC Corporation) was added instead of the additive 5 (distearyl dimerate, manufactured by INOAC Corporation) in Example 1.

The polyurethane foam of Example 5 has a density of 54.3 kg/m$^3$, a hardness of 143 N, impact resilience of 53.2%, an airflow quantity of 92.1 cc/cm$^2$/s, a resonance frequency of 4.12 Hz, a resonance magnification of 2.98, an integrated value of a transmissibility of 1 or more at a vibration frequency of from 5 Hz to 10 Hz of 855, and "good" foaming moldability.

The polyurethane foam of Example 5 has an airflow quantity of 6 cc/cm$^2$/s or more, a resonance magnification in the vibration test by JASO B407 in a range of 1.5 to 3.43, and an integrated value of a transmissibility of 1 or more at a vibration frequency of from 5 Hz to 10 Hz in a range of 500 to less than 915, so that discomfort due to vibration during vehicle running is small, and a sitting feeling is good. Since the hardness is in a range of 80 N to 250 N, it is possible to reduce bottoming at the time of seating and to improve the sitting feeling.

Comparative Example 1

Comparative Example 1 is the same as Examples 1 to 4 except that none of the additives 1 to 5 is contained and an isocyanate index was 100.

The polyurethane foam of Comparative Example 1 has a density of 50.3 kg/m$^3$, a hardness of 144 N, impact resilience of 53.7%, an airflow quantity of 118 cc/cm$^2$/s, a resonance frequency of 3.96 Hz, a resonance magnification of 3.43, an integrated value of a transmissibility of 1 or more at a vibration frequency of from 5 Hz to 10 Hz of 915, and "good" foaming moldability.

The polyurethane foam of Comparative Example 1 has a resonance magnification in the vibration test by JASO B407 exceeding a range of 1.5 to 3.43, and an integrated value of a transmissibility of 1 or more at a vibration frequency of from 5 Hz to 10 Hz exceeding a range of 500 to less than 915, so that discomfort due to vibration is large, and a good sitting feeling cannot be obtained.

Comparative Example 2

Comparative Example 2 is the same as Comparative Example 1 except that 10 parts by weight of the additive 1 (diisononyl adipate, product name: DINA) was added.

The polyurethane foam of Comparative Example 2 has a density of 57.4 kg/m$^3$, a hardness of 120 N, impact resilience of 55.6%, an airflow quantity of 90.8 cc/cm$^2$/s, a resonance frequency of 4.65 Hz, a resonance magnification of 3.53, an integrated value of a transmissibility of 1 or more at a vibration frequency of from 5 Hz to 10 Hz of 964, and "good" foaming moldability.

The polyurethane foam of Comparative Example 2 has a resonance magnification in the vibration test by JASO B407 exceeding a range of 1.5 to 3.43, and an integrated value of a transmissibility of 1 or more at a vibration frequency of from 5 Hz to 10 Hz exceeding a range of 500 to less than 915, so that discomfort due to vibration is large, and a good sitting feeling cannot be obtained.

Comparative Example 3

Comparative Example 3 is the same as Comparative Example 2 except that 20 parts by weight of the additive 1 (diisononyl adipate, product name: DINA) was added and an isocyanate index is 105.

The polyurethane foam of Comparative Example 3 has a density of 70.7 kg/m$^3$, a hardness of 127 N, impact resilience of 53.6%, an airflow quantity of 35 cc/cm$^2$/s, a resonance frequency of 5.10 Hz, a resonance magnification of 3.22, an integrated value of a transmissibility of 1 or more at a vibration frequency of from 5 Hz to 10 Hz of 991, and "good" foaming moldability.

The polyurethane foam of Comparative Example 3 has an integrated value of a transmissibility of 1 or more at a vibration frequency of from 5 Hz to 10 Hz in the vibration test by JASO B407 exceeding a range of 500 to less than 915, so that discomfort due to vibration is large, and a good sitting feeling cannot be obtained.

Comparative Example 4

Comparative Example 4 is the same as Comparative Example 1 except that 10 parts by weight of the additive 3 (grease, product name: FPL-32) was added.

The polyurethane foam of Comparative Example 4 has a density of 52.9 kg/m$^3$, a hardness of 117 N, impact resilience of 25.5%, an airflow quantity of 3.2 cc/cm$^2$/s, a resonance frequency of 8.69 Hz, a resonance magnification of 2.32, an integrated value of a transmissibility of 1 or more at a vibration frequency of from 5 Hz to 10 Hz of 1072, and "good" foaming moldability.

The polyurethane foam of Comparative Example 4 has an integrated value of a transmissibility of 1 or more at a vibration frequency of from 5 Hz to 10 Hz in the vibration test by JASO B407 exceeding a range of 500 to less than 915, so that discomfort due to vibration is large, and a good sitting feeling cannot be obtained.

Comparative Example 5

Comparative Example 5 is the same as Comparative Example 4 except that 20 parts by weight of the additive 3 (grease, product name: FPL-32) was added.

The polyurethane foam of Comparative Example 5 has a density of 54.2 kg/m$^3$, a hardness of 109 N, impact resilience of 43%, an airflow quantity of 0.1 cc/cm$^2$/s, a resonance frequency of 9.07 Hz, a resonance magnification of 2.48, an integrated value of a transmissibility of 1 or more at a vibration frequency of from 5 Hz to 10 Hz of 1065, and "good" foaming moldability.

The polyurethane foam of Comparative Example 5 has an integrated value of a transmissibility of 1 or more at a vibration frequency of from 5 Hz to 10 Hz in the vibration test by JASO B407 exceeding a range of 500 to less than 915, so that discomfort due to vibration is large, and a good sitting feeling cannot be obtained.

Comparative Example 6

Comparative Example 6 is the same as Comparative Example 1 except that 10 parts by weight of the additive 4 (isohexadecyl stearate, manufactured by FUJIFILM Wako Chemical Corporation) was added.

The polyurethane foam of Comparative Example 6 has a density of 59.6 kg/m$^3$, a hardness of 128 N, impact resilience of 55%, an airflow quantity of 137 cc/cm$^2$/s, a resonance frequency of 4.0 Hz, a resonance magnification of 3.8, an integrated value of a transmissibility of 1 or more at a vibration frequency of from 5 Hz to 10 Hz of 623, and "good" foaming moldability.

The polyurethane foam of Comparative Example 6 has a resonance magnification in the vibration test by JASO B407 exceeding a range of 1.5 to less than 3.43, so that discomfort due to vibration is large, and a good sitting feeling cannot be obtained.

Comparative Example 7

Comparative Example 7 is the same as Comparative Example 6 except that 20 parts by weight of the additive 4 (product name: isohexadecyl stearate, manufactured by FUJIFILM Wako Chemical Corporation) was added.

The polyurethane foam of Comparative Example 7 has a density of 74.3 kg/m$^3$, a hardness of 110 N, impact resilience of 54%, an airflow quantity of 14.5 cc/cm$^2$/s, a resonance frequency of 4.9 Hz, a resonance magnification of 3.1, an integrated value of a transmissibility of 1 or more at a vibration frequency of from 5 Hz to 10 Hz of 785.1, and "poor" foaming moldability.

In the polyurethane foam of Comparative Example 7, a foamed state was a punctured state, and a good foam usable as a cushion pad was not obtained.

In this way, the vehicle cushion pad and the vehicle seat cushion of the present invention can reduce discomfort due to vibration during running of a vehicle and can obtain a good sitting feeling.

REFERENCE SIGN LIST

10 Vehicle seat
11 Seat frame
21 Cushion main body
31 Cushion pad
35 Skin material
40 Vehicle seat cushion

What is claimed is:

1. A vehicle cushion pad comprising a polyurethane foam, wherein
    the polyurethane foam is prepared from a polyurethane foam composition containing a polyol, an isocyanate, a catalyst, a foaming agent and a dicarboxylic acid ester compound,
    the dicarboxylic acid ester compound is an ester condensate prepared from one dicarboxylic acid molecule and two alcohol molecules, wherein the one dicarboxylic acid molecule is a dimer acid molecule and the dicarboxylic acid ester compound is selected from distearyl dimerate, dilauryl dimerate, and a polyester polyol dimerate having a weight average molecular weight (MW) of 2,500 g/mol, a melting point lower than −20° C., and an OH value of 74.4 mgKOH/g,
    a content of the dicarboxylic acid ester compound is 10 to 20 parts by weight with respect to 100 parts by weight of the polyol, and
    an airflow quantity of the polyurethane foam in accordance with JIS K 6400-7:2012 is 6.0 cc/cm$^2$/s or more.

2. The vehicle cushion pad according to claim 1, wherein the polyurethane foam has a resonance magnification in a vibration test in accordance with JASO B407 of 1.5 to less than 3.43, and
    an integrated value of a transmissibility of 1 or more at a vibration frequency of from 5 Hz to 10 Hz of 500 to less than 915.

3. The vehicle cushion pad according to claim 1, wherein the polyurethane foam has a hardness in accordance with JIS K 6400-2:2012 6.7 D method of 80 N to 250 N.

4. The vehicle cushion pad according to claim 1, wherein the polyurethane foam has a density of 30 kg/m$^3$ to 150 kg/m$^3$ in accordance with JIS K7220.

5. The vehicle cushion pad according to claim 1, wherein the dicarboxylic acid ester compound is the polyester polyol dimerate.

6. A vehicle seat cushion comprising a cushion main body and the vehicle cushion pad according to claim 1 placed on the cushion main body.

* * * * *